United States Patent [19]
Altes

[11] 3,952,280
[45] Apr. 20, 1976

[54] RADIATION MONITORING OF AN OBJECT SPACE WITH A CLUTTER SUPPRESSION TECHNIQUE

[75] Inventor: Richard A. Altes, Palo Alto, Calif.

[73] Assignee: ESL Incorporated, Sunnyvale, Calif.

[22] Filed: Jan. 10, 1974

[21] Appl. No.: 432,169

[52] U.S. Cl. .............................. 340/3 R; 343/5 SA
[51] Int. Cl.² .................... G01S 9/66; G01S 7/66
[58] Field of Search ............... 343/5 SA, 100 CL; 340/3 R, 3 M, 15.5 F

[56] References Cited
UNITED STATES PATENTS

| | | | |
|---|---|---|---|
| 2,368,953 | 2/1945 | Walsh | 343/5 SA |
| 3,311,914 | 3/1967 | Barringer | 343/5 SA |
| 3,614,719 | 10/1971 | Treacy | 340/3 R |
| 3,636,562 | 1/1972 | Wehner | 343/5 SA |
| 3,716,823 | 2/1973 | Thompson et al. | 340/3 R |

OTHER PUBLICATIONS
Faust, Geophysics, Vol. XXVIII, No. 1 Feb. 1963, pp. 1–7.

*Primary Examiner*—Richard A. Farley
*Attorney, Agent, or Firm*—Limbach, Limbach & Sutton

[57] ABSTRACT

A technique for monitoring an object space having known cluttering objects for determining when an object of interest enters the object space. An application of the technique is in sonar supervision of a river or other body of water wherein the entrance into the monitored space by the object of interest, such as a shark or swimmer, is readily detected. Such detection is accomplished by illuminating a monitored object space with broad band radiation. Radiation either reflected from or transmitted through the object is then converted to an electrical signal that is passed through a bank of bandpass filters. The filter outputs are weighted to maximize the receiver's response to the object of interest while minimizing the response to clutter and noise. The technique is based upon the observation that different reflectors give rise to different echo spectra when the reflectors are illuminated with a broad band signal.

5 Claims, 4 Drawing Figures

RADIATION MONITORING OF AN OBJECT SPACE WITH A CLUTTER SUPPRESSION TECHNIQUE

BACKGROUND OF THE INVENTION

This invention relates generally to the art of observing an object space with radiation, and more particularly pertains to a technique for discriminating between different objects of varying shape and other characteristics which affect their reaction to illuminating radiation.

Standard radar and sonar techniques for discriminating between different objects (targets) is cumbersome. A narrow band radiation signal is directed at an object and the reflected radiation is used to determine range and velocity of the object. The narrow bandwidth of the radiation chosen is that with which the object reacts favorably as a reflector. The range and velocity information as to each object in an object space being observed is then used to discriminate one type of object from another. For instance, if a river channel is being monitored by sonar techniques, the position of various rocks in the channel are known. A moving object such as a large fish or ship can then be detected because its range and velocity are different from those known objects (clutter) such as rocks in the shipping channel. This standard technique of discrimination among objects is complicated, however, since the information obtained from the clutter objects must be considered by an operator as to whether it indicates the presence of an object of interest each time the channel object space is observed with the radiation.

Therefore, it is a primary object of the present invention to provide a technique for discriminating among different objects in a radiation field of view with less complication and operator interpretation than is now required in present sonar and radar techniques.

SUMMARY OF THE INVENTION

Briefly, this and additional objects are accomplished by the present invention by applying a known theoretical approach to characterizing an object field as a linear combination (summation) of the transfer functions of the individual objects within the field. A transfer function is that characteristic of an object expressed in the frequency domain which when multiplied by a mathemathical description of incident radiation on the object will result in a mathematical description of the modified radiation received back therefrom. The transfer function of an object is determined by its physical characteristics which affect the interaction of that object with the particular type and frequency of radiation incident upon it. For sonar work, for instance, wherein an ultrasonic beam is directed to an object and the reflected ultrasonic radiation detected, the transfer function which determines the nature of the reflected radiation is dependent primarily upon the object's shape, its internal structure, the magnitude and rapidity of acoustic impedance change at its boundaries, etc. In another application of ultrasonic testing wherein a beam of ultrasonic energy is passed through an object and the transmitted radiation detected as the object modified beam, the transparency of the object to the illuminating radiation determines its transfer function. If light is the incident radiation, as another example, an object's color is an important factor in determining what part of the incident radiation will find its way into a reflected or transmitted object modified beam that is detected. The techniques of the present invention are applicable over a wide range of types of radiation and types of objects.

According to the present invention, a radiation beam having a wide frequency range (broad bandwidth) is directed at an object field and the object modified radiation either reflected therefrom or transmitted therethrough is detected. Each different type of object will contribute a different frequency bandwidth to the composite object modified radiation depending upon the object's transfer function. The technique of the present invention discriminates between two objects having different transfer functions by passing a received electronic signal through a bank of bandpass filters. The filter outputs are weighted so that the response to the desired object is large, while the response to the extraneous reflector (clutter) is comparatively small, when the weighted filter outputs are added together. An application of this technique is in the river channel example discussed above wherein the clutter objects in the form of rocks have one transfer function and the object to be detected, such as a large fish or vessel, has a different transfer function. The electronic filter bank is tuned to accentuate the radiation reflected from the desired object (fish or vessel) while tuned to simultaneously attenuating the radiation reflected from the cluttering rocks.

Although sonar or radar applications of the technique of the present invention are discussed as examples herein, it will be understood that the techniques of the present invention are useful with a wide variety of frequency ranges and types of radiation. One of the types of radiation is "compressional wave energy," by which is meant acoustic energy and ultrasonic radiation. Another broad class of radiation is "electromagnetic" radiation which includes the microwave portion of the spectrum, the radar portion, light, etc. A primary requirement of the radiation with which the techniques of the present invention may be utilized is that it be somewhat controllable as to direction and be capable of generation over a broad bandwidth of frequencies. Applications of the clutter suppression techniques of the present invention include non-destructive ultrasonic testing and medical diagnostic ultrasonic techniques. Further, the "radiation path" between transmitter and receiver may be through any of a wide variety of media, such as air, water, and even wholly within an electronic system wherein the "objects" are radiation modifying elements or characteristics of the system which behave as linear filters.

Additional objects, advantages and features of the present invention will become apparent from the following description which should be taken in conjunction with the accompanying drawings.

DESCRIPTION OF THE PREFERRED EMBODIMENT

Figure 1:
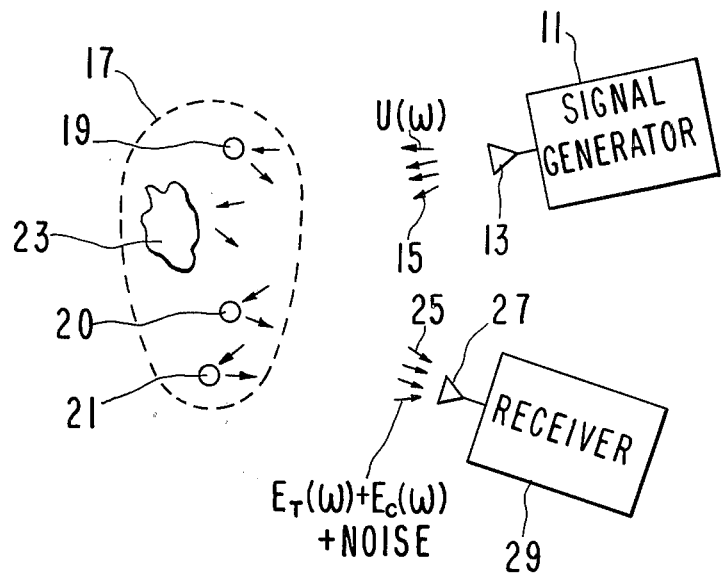
FIG. 1 schematically represents a general application of the techniques of the present invention.

Referring to FIG. 1, an electronic signal generator 11 drives a transducer 13 for generating an illumination radiation beam 15 with a frequency spectrum represented by $U(\omega)$. An object space or field 17 is illuminated with the radiation beam 15. Within the object space 17 are several objects 19, 20 and 21 which clutter the object field 17 when the existence of another object 23 therein is attempted to be determined.

The individual objects within the object space 17 reflect energy from the illumination beam 15 into an object modified beam 25. A radiation transducer 27 converts this radiation into an electrical signal which is then processed by an electronic receiver 29. The cluttering objects 19–21 could be, for example, the rocks in a river channel as described above while the object 23 could be a fish or shipping vessel whose presence is to be detected by the receiver 29. For different applications, the object modified beam detected may be that transmitted through an object such as is sometimes the case in ultrasonic medical applications and non-destructive industrial testing. In the reflective example of FIG. 1, each of the cluttering objects 19 through 21 contributes to the object modified beam 25 an average signal spectrum $E_C(\omega)$. That is, the frequency spectrum of the radiation reflected from each of the objects 19 through 21 may be slightly different, but the average spectral magnitude is still a good description of the clutter objects and is different from the echo spectrum $E_T(\omega)$ that is received from a typical object of interest (object 23). This difference is caused by shape, internal structure, and acoustic impedance changes within the reflectors. These signal components (plus whatever noise may be present from the medium in which the radiation is traveling or from other unknown objects) make up the object modified beam 25 in whose path the transducer 27 is positioned. For certain types of radiation, of course, some form of a beam controlling element, such as acoustic or light lenses, would be required in a practical embodiment.

Figure 3F:
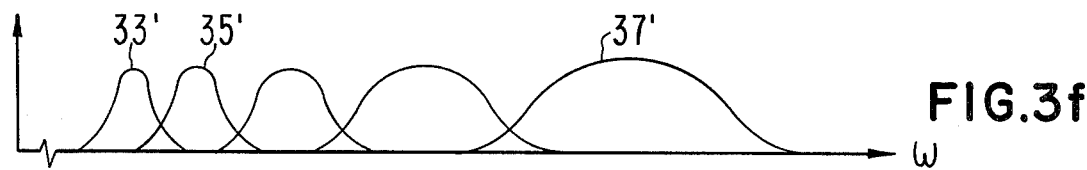
FIG. 3 shows various illustrative waveforms generated in carrying out the techniques illustrated in FIGS. 1 and 2.
Figure 3E:
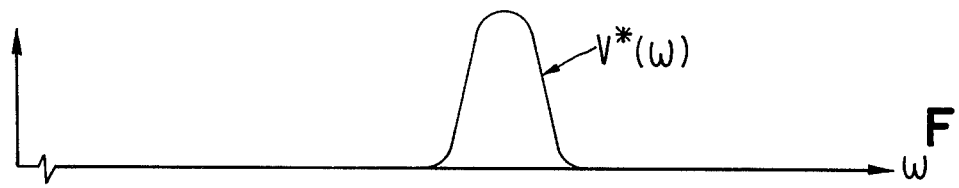
Figure 3D:
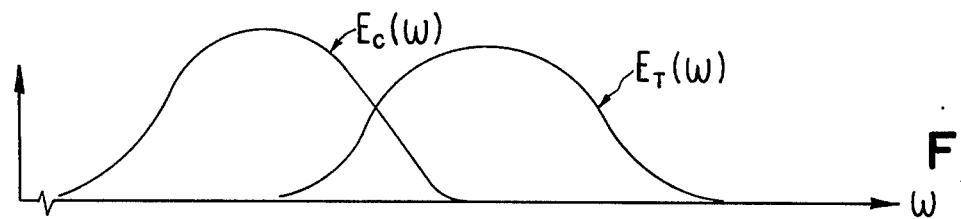

If the average echo spectra $E_C(\omega)$ and $E_T(\omega)$ reflected from the cluttering object and the object of interest, contain most of their radiant energy in freqency bandwidth which are substantially non-overlapping as shown in FIG. 3(d) as a specific example, then the receiver 29 by a proper bank of filters may detect the existence of the object 23 by looking for its reflective energy spectra signal $E_T(\omega)$. At the same time, such a filter can suppress the frequency spectra reflected from the objects 19–21 in the form of a signal $E_C(\omega)$. A determination that an object 23 of interest is within the object field 17 is simply made by observing the output of such an electronic filtering device within the receiver 29. This technique is based upon discriminating between objects by observing their different reflected radiation spectra. The clutter objects 19–21 and the object of interest 23 have different transfer functions; that is, they affect the incident radiation 15 in different ways which can be detected electronically.

Even if the spectra $E_C(\omega)$ and $E_T(\omega)$ overlap, there will generally be frequency intervals where $E_T(\omega)$ is larger than $E_C(\omega)$, and vice versa. The receiver is designed to accentuate those intervals where $E_T(\omega)$ is large relative to $E_C(\omega)$ and relative to the power density spectrum of environmental and electronic noise.

Figure 3A:
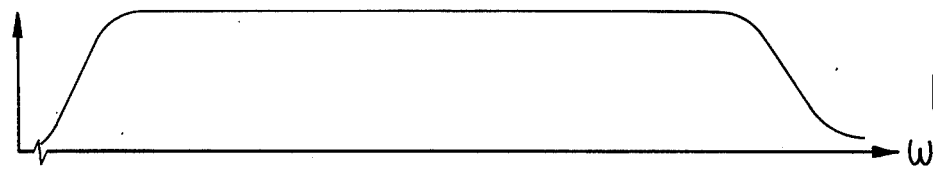
Figure 3B:
Figure 3C:
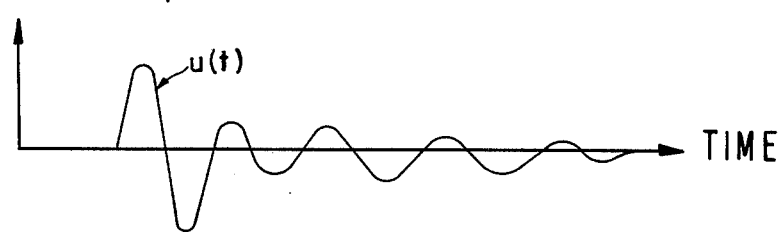

A filter in the receiver 29 maximizes its output in response to the desired object reflected spectra $E_T(\omega)$ being received by the transducer 27. The same filter is tuned to have a very low output to the clutter object spectra $E_C(\omega)$. Referring to FIG. 3, the curve of FIG. 3(a) shows in the frequency domain the characteristic of the transmitted radiation $U(\omega)$. In an ultrasonic application, this spectra may extend, for example, between 20 and 50 kHz. with peak power at about 120 kHz. FIG. 3(b) shows, in the time domain, a single bipolar pulse that typically may be generated by the signal generator 11 of FIG. 1 in driving the transducer 13. The radiation output of the transducer 13 in the time domain is illustrated in FIG. 3(c). FIGS. 3(a) and 3(c) therefore represent the same illuminating beam 15 in the frequency and time domains, respectively. A transducer 13 may be constructed of a plurality of piezo-electric elements driven simultaneously by the input waveform of FIG. 3(b).

FIG. 3(d) illustrates idealized bandwidths of the clutter and desired object spectra $E_C(\omega)$ and $E_T(\omega)$, respectively, of the object modified beam 25 of FIG. 1. The desired object 23 receives a wide bandwidth signal of FIG. 3(a) but may return only a narrower bandwidth signal of FIG. 3(d) this transformation depending upon the shape of the object 23 and other characteristics which affect the radiation illumination. The difference between the reflected spectra $E_T(\omega)$ and $E_C(\omega)$ permits discrimination between the objects generating such spectra. Discrimination is accomplished by a bank of filters having an overall transfer function $V^*(\omega)$, as illustrated in FIG. 3(e). It will be noted with respect to FIGS. 3(d) and 3(e) that the bank of filters is weighted heavily in favor of passing $E_T(\omega)$ that is reflected from the object 23.

Figure 2:
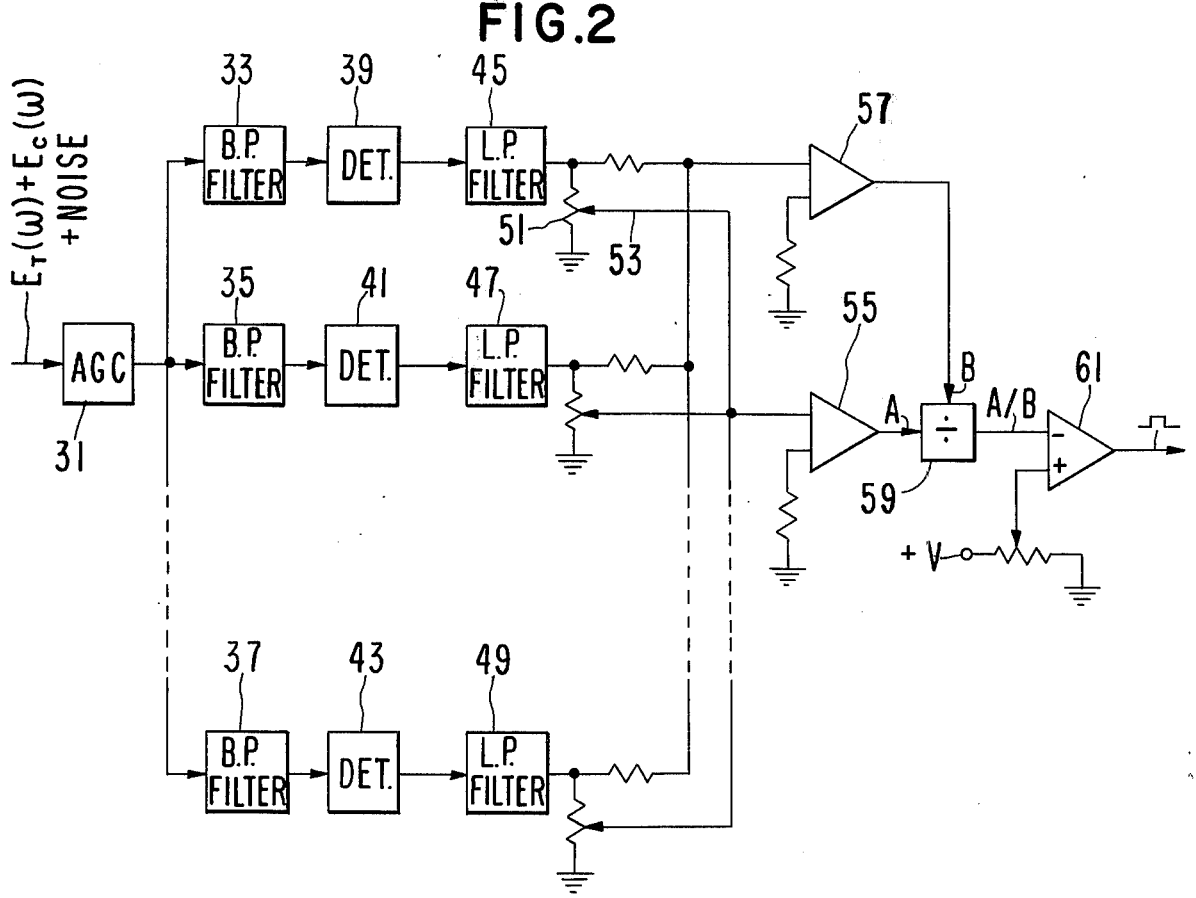
FIG. 2 illustrates in block diagram form a portion of electronic circuitry for the radiation receiver of FIG. 1.

The structure of such a filter device for use within the receiver 29 of FIG. 1 is illustrated in detail in FIG. 2. The electrical signal output of the transducer 27 of FIG. 1 is first applied to an automatic gain control circuit 31 (FIG. 2). The circuit 31 is a peak detecting type of automatic gain control (A.G.C.) which is utilized to prevent saturation of subsequent filter amplifiers for large transient signal inputs. An output of the automatic gain control is applied to inputs of plurality of filters in parallel, such as the filters 33, 35 and 37 illustrated in FIG. 2. Twenty such filters may typically be used. Each of these filters is going to have a different bandpass as illustrated in FIG. 3(f) wherein the frequencies passed by each of the filters 33, 35 and 37 is indicated by the same reference number with a prime (') added thereto.

Each of the bandpass filters 33, 35 and 37 is an active filter containing a number of operational amplifiers and having individual adjustments for its center frequency and frequency bandwidth which it passes. These two adjustments set the "Q" of the filter. There is also an adjustment in each of the filters for the amplitude of its bandpass and this amplitude is made to be the same for each of the filters. The result is a plurality of individual filters which pass a portion of the bandwidth of a signal applied at the output of the automatic gain control 31. Each of the filters is adjusted to have the same "Q"; that is, to have the same ratio of the center frequency to the bandwidth as all other filters. The frequency bandpass of each filter is made to slightly overlap that of other filters as shown in FIG. 3(f). Such a filter design is described in more detail in the *IEEE Journal of Solid State Circuits*, April, 1970 in an article "Active R.C. Bandpass Filter With Independent Tuning and Selectivity Controls," appearing on pages 74 and 75. A constant "Q" filter configuration provides a system that is quite insensitive to motion of the objects being irradiated.

The alternating current outputs of the filters 33, 35 and 37 are applied, respectively, to detectors 39, 41 and 43. These detectors may each be, for instance, a series diode connected with a capacitance to ground for filtering. The outputs of these detectors are applied to individual lowpass filters 45, 47 and 49 which produce direct current outputs. The voltage level of the outputs of each of the lowpass filters 45, 47 and 49 is proportional to the amount of energy of the electrical signal derived from the transducer 27 (FIG. 1) and the bandwidth of their associated bandpass filters 33, 35 and 37, respectively. Each of the lowpass filters 45, 47 and 49 may be integrator constructed with an operational amplifier.

The direct current output of each of the lowpass filters 45, 47 and 49 is applied to a weighting potentiometer, such as the potentiometer 51 connected between the output of the lowpass filter 45 and ground potential. The potentiometer 51 acts as an adjustable voltage divider wherein its output 53 may be adjusted to something between 0 and 100% of the output of the lowpass filter 45. All of the outputs of the potentiometers are summed at an input of an operational amplifier 55. The outputs of the lowpass filters 45, 47 and 49 are also individually applied through series resistances to an input of another summing operational amplifier 57. The outputs of the amplifiers 55 and 57 are applied to an analog division circuit 59 in order to form a normalized output which is applied to an inverting input of a comparator amplifier 61. The result is that each of the potentiometers, such as the potentiometers 51, sets the weight that its associated filter spectrum contributes to the overall transfer function of the receiver at the output of the amplifier 55. The output of the amplifier 57 is a signal proportional to the sum of the unweighted output of each of the filter paths and is divided into the output of the amplifier 55 so that the input to the comparator 61 is always within a certain predetermined range. This division acts as another automatic gain control, and prevents large clutter reflectors from being interpreted as objects (targets) of interest. This signal to the inverting input of the comparator 61 is compared with an adjustable voltage to the non-inverting input of the comparator 61. When the voltage input to the inverting input of the comparator 61 from the analog divider 69 exceeds this threshold value, the output of the comparator 61 changes state and this state change is an indication that a desired object, such as the object 23 of FIG. 1, has come into the radiation field of view.

The overall transfer function of the receiver of FIG. 2 is illustrated in FIG. 3(e). This overall receiver transfer function $V^*(\omega)$ is formed from the individual bandpass filter characteristics of FIG. 3(f) by appropriately adjusting their associated weighting potentiometers. For instance, in the example shown in FIG. 3(e), the bandpass filter 33 having a bandpass 33' in FIG. 3(f) would effectively be rendered inoperative by adjusting its associated potentiometer so that an output 53 would be zero no matter what the input is. Other of the bandpass filters of FIG. 2 would have their weighting potentiometers adjusted to permit some of their output to reach the summing amplifier 55, however, in order to form the overall frequency response illustrated in FIG. 3(e).

A significant advantage of the technique and apparatus discussed above is that the comparator 61 of FIG. 2 produces an output only when a foreign object in the nature of the desired object 23 comes into the field of view. Some indication device may then be initiated. An operator does not have to constantly monitor data received of the cluttering objects 19–21 since data as to those objects is automatically discriminated against by the filtering operation described. There is very little room for human error since extensive interpretation of sonar or radar data is not required. Each time a burst of energy is emitted from the transducer 13 there will be no data at the output of the comparator 61 to interpret unless the desired object 23 for which the filter has been programmed exists in the object field 17.

The apparatus of FIGS. 1 and 2 is adjusted for a particular environment of cluttering objects and desired objects in advance of its use. The first step in such an adjustment is to include only the object 23 of interest in the path of the radiation beam 15. As the transducer 13 is pulsed, the outputs of the bandpass filters 45, 47 and 49 are individually measured in terms of average voltage. This measurement is preferably done in a clean environment with a minimum amount of background clutter and noise. For instance, if a ship of a certain type is the desired object 23 to be detected in a river channel wherein the techniques of the present invention are applied to sonar, then a ship of that type is positioned in as noise free an environment as possible and the measurements above mentioned of the filter of FIG. 2 are taken.

The next step in aligning the equipment of FIGS. 1 and 2 is to set up the transducers 13 and 27 with the associated electronic equipment in the environment where the monitoring is desired to take place. For instance, in the example of the river channel this would be in the river channel itself. The same measurement of the average voltage output of the lowpass filters 45, 47 and 49 is thus made in response to a pulse of radiation from the transducer 13. During this test, the desired object 23 is removed from the field so that only the clutter objects 19 through 21 and any noise from the environment contribute to the voltage readings being made.

The next step is to calculate the weighting factors and set each of the variable potentiometers, including the potentiometer 51 of FIG. 2. This is accomplished by taking a ratio of each lowpass filter average voltage output obtained when the desired object 23 is being measured and dividing that by the square of the average voltage in the noisy and clutter object filled environment. This ratio thus establishes the relative potentiometer settings of each of the voltage dividing potentiometers at the output of the lowpass filters in the specific configuration of FIG. 2. Once these potentiometers are so set, the apparatus is ready to detect the existence of the desired object 23 within the object field 17.

Figure 4:
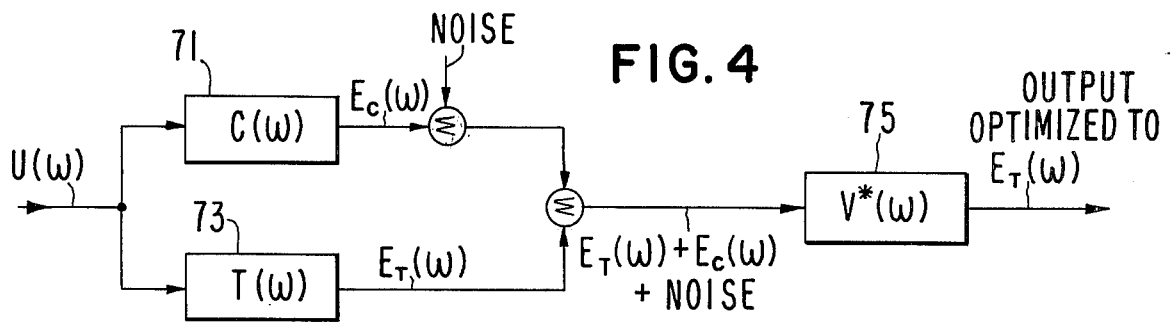
FIG. 4 illustrates a mathematical model of the system of FIG. 1.

Referring to FIG. 4, a mathematical model of a sonar or radar echo (reflection) system embodying the techniques described above is shown. Incident radiation having a spectrum $U(\omega)$ is directed toward a clutter object or objects 71 having a reflective transfer function of $C(\omega)$. A desired object 73 (target) having a reflective transfer function $T(\omega)$ is also so illuminated. An echo spectrum of the cluter object 71 is thus given as:

$$E_C(\omega) = U(\omega).C(\omega)$$

The spectrum reflected from the desired object (target) 73 is given by:

$$E_T(\omega) = U(\omega).T(\omega)$$

Because each of these objects, with different spectra reflective characteristics to the incident radiation $U(\omega)$, can be considered as linear filters as shown in FIG. 4, the input to an electronic receiver 75 may be viewed as a simple arithmetic addition of the two spectra from these two types of objects. The receiver 75 is then given a transfer function such that it accentuates a signal with spectrum $E_T(\omega)$ while attenuating a signal with spectrum $E_C(\omega)$.

To optimize such a system, it is desirable to choose a combination of a transmitted signal spectrum $U(\omega)$ and receiver transfer function $V^*(\omega)$ in order to maximize a ratio equal to the receiver response to the desired object (target) echo divided by the receiver response to noise and clutter echoes. (Signal-to-interference ratio maximization)

To meet this condition the transfer function of the receiver 75, which is that of the bank of filters illustrated in FIG. 2, has been derived to be as follows:

$$V^*(\omega) = \frac{T^*(\omega)U^*(\omega)}{k+|C(\omega)U(\omega)|^2}$$

By a similar derivation, the optimum spectrum of the illuminating radiation is given by:

$$U(\omega) = \frac{T^*(\omega)V(\omega)}{k+|C(\omega)V(\omega)|^2}$$

The "k" of the above two expressions are constants which are related to noise in the system. The optimum combination of filter transfer function $V^*(\omega)$ and illuminating radiation spectrum $U(\omega)$ are given by a simultaneous solution of the above two equations where the average transfer functions $T(\omega)$ and $C(\omega)$ of the desired object and clutter, respectively, are known. These transfer functions may conveniently be determined by measurement.

Techniques prior to this invention have also maximized a signal-to-interference ratio but have been narrow frequency band techniques that ignore the shape of the objects by assuming both desired and clutter objects to be planar. The two types of objects are distinguished by their differing range and velocity characteristics. The present invention, on the other hand, utilizes the idea that different objects (reflectors) yield different modified radiation (echoes) because of differing shapes and other characteristics. The use of a constant-Q filter bank minimizes the effects of differing object velocity upon the result obtained.

It will be understood that although the present invention has been described with respect to a specific example, the invention is entitled to protection within the full scope of the appended claims.

I claim:

1. A method of detecting the existence of an object of interest within an object space which also includes at least one cluttering object that has a different transfer function to incident radiation than said object of interest, comprising the steps of:

directing toward said object space radiation having a bandwidth sufficiently large so that radiation modified by the object space has different frequency spectra for each of said cluttering object and object of interest, transducing the object space modified radiation to form an electrical signal representative thereof, and determining from said electrical signal whether said object space modified radiation contains the spectrum of said object of interest including the step of passing said electrical signal through a plurality of constant-Q filters in parallel where each of the filters passes a different frequency band and are weighted individually so that the overall composite filter maximizes its output in response to the spectrum of the object of interest while minimizing its output in response to the spectrum of said at least one cluttering object.

2. A method of detecting the existence of an object with a transfer function $T(\omega)$ in an object space including at least one cluttering object having a different transfer function $C(\omega)$, comprising the steps of:

directing radiation having a spectrum $U(\omega)$ toward said object space, thereby forming an object space modified beam including a component $U(\omega).C(\omega)$ from said at least one cluttering object and $U(\omega).T(\omega)$ from said object of interest when it exists in said object space, transducing said object space modified beam in a manner to form an electrical signal corresponding thereto, and passing said electrical signal through an electronic filter having a transfer function that is substantially equal to $$\frac{T^*(\omega)U^*(\omega)}{\text{constant}+|C(\omega)U(\omega)|^2},$$

thereby maximizing a ratio of response of the object received radiation component $U(\omega).T(\omega)$ to the clutter received radiation component, whereby the existence of the object of interest is detected when in said object space.

3. A method of detecting the existence of an object of interest within an object space even though that object space may include at least one cluttering object that has a different transfer function to incident radiation than said object of interest, comprising the steps of:

directing toward said object space a radiation pulse having a bandwidth sufficiently large so that radiation modified by the object space has different frequency spectra for each of said cluttering object and said object of interest, transducing the object space modified radiation to form an electrical signal representative thereof, applying said electrical signal to a plurality of constant Q electronic filter paths in parallel, each of said filter paths passing a distinct band of frequencies in a manner that the sum of the path bandpasses is substantially a continuous frequency spectrum generally coincident with the frequencies of said broadband pulse, and combining signal outputs of each of said plurality of electronic filter paths to form a single electrical output signal, said gain of each of said electronic filter paths being adjusted relative to the gains of all other of said filter paths to maximize said output signal when the object of interest is present in the object space relative to the level of said signal that occurs when said at least one cluttering object is present without said object of interest.

4. A method according to claim 3 which comprises the additional steps of:

combining the outputs of each of said plurality of electronic filter paths that are unaffected by said gain adjustments, thereby forming an unadjusted output signal, electronically combining said unadjusted signal with said single electronic signal output in order to form a single normalized output signal, and comparing said normalized output signal with a reference signal and emitting a comparison signal when the normalized signal is in excess thereof, said comparison signal being at a level less than the value of said normalized signal resulting from said object of interest being positioned in said object space but above the normalized output signal resulting from said at least one cluttering object being present in said space without said object of interest.

5. The method according to claim 3 which additionally comprises in advance of irradiating the object space with said broadband pulse, a method of adjusting the relative gains of each of the electronic filter paths, comprising the steps of:

measuring the unadjusted output signal of each of the filter paths individually under a condition where said object of interest is irradiated in an environment absent said at least one cluttering object, said filter output signals resulting from detection of the object modified radiation of said object of interest, again measuring the individual output signals of each of the electronic filter paths with said at least one cluttering object being irradiated with a broadband pulse, said signals resulting from the clutter object modified irradiation, and individually setting the gain of each of said electronic filter paths to be a fraction of its gain when said individual voltage measurements were made according to the relationship of the path output signal resulting from the object of interest divided by the square of the output signal resulting from said at least one cluttering object.

* * * * *